United States Patent Office.

LOUIS PARVILLÉE, OF PARIS, FRANCE.

PROCESS OF FABRICATING METALLOCERAMIC RESISTANCES.

SPECIFICATION forming part of Letters Patent No. 602,227, dated April 12, 1898.

Application filed November 13, 1897. Serial No. 658,450. (No specimens.) Patented in France September 24, 1896, No. 279,952, and in Germany December 1, 1896, No. 94,293.

*To all whom it may concern:*

Be it known that I, LOUIS PARVILLÉE, a citizen of the French Republic, residing at Paris, France, have invented a new and useful Metalloceramic Product and Method of Making the Same, of which the following is a specification, the invention having been patented in France under date of September 24, 1896, No. 279,952, and in Germany under date of December 1, 1896, No. 94,293.

The object of the present invention is the fabrication of a metalloceramic product which under a small volume offers a very great resistance and may at the same time be heated by the electric current to very high temperatures.

My invention is based upon the diminution of conductibility of metals, which I obtain by adding to any metallic powder extraneous bodies—such as quartz, kaolin, plastic clay, feldspar, or others—in proportions which vary on one part with the degree of fusibility and the nature of the metals used and, on the other hand, with the resistance which it is desired to obtain. These extraneous bodies aid, moreover, in giving a very great solidity to the mixture, which is baked with charcoal and in a closed recipient at temperatures varying with the degree of fusibility of the metals. I can use all metals, whatever their fineness may be.

The following mixture gives very good results for heating purposes:

|   |   | Grams. |
|---|---|---|
| A | Nickel, granulated, crushed by the dry process | 63 |
|   | Quartz crushed by the wet process | 27 |
|   | Kaolin crushed by the wet process | 10 |
| B flux |   | 15 |
|   | Total | 115 |

Composition of the B flux:

|   | Grams. |
|---|---|
| Silica | 20 |
| Carbonate of lead | 66 |
| Calcined borax | 14 |
| Total | 100 | smelted and crushed very fine by the wet process.

The introduction of the B flux is intended to prevent the oxidation of the metal.

The A composition, mixed with water, dried, and pulverized, is ready for use when it no longer contains more than about five per cent. water. The same composition prepared with nickel crushed by the wet process gives very good results as to resistances, and its conductibility is smaller than when nickel crushed by the dry process is used.

The above composition is pressed into molds, as pencils or plates, by means of the hydraulic press at a pressure of two thousand kilograms per square centimeter. The baking takes place as stated above, and at the temperature of 1,200° after the Lechatellier pyrometer.

With regard to pencils which are to be used for heating purposes, in order to avoid the formation of sparks at the contacts the ends of said pencils are made harder, and consequently rendered better conductors, through the introduction of a somewhat larger quantity of metallic powder at the ends of the mold. For other purposes the ends of the pencils can be covered with a galvanic deposit in order to insure a perfect contact.

The pieces manufactured after this process can be varnished with the above-mentioned B flux in order to prevent the oxidation of the metal if said pieces are to be heated to a high temperature.

I claim as being my property:

1. The herein-described process of making metalloceramic resistances for electrical purposes consisting in mixing a metallic powder with extraneous bodies such as quartz, kaolin, clay or feldspar and with a flux, subjecting the whole to pressure and then firing the same, substantially as described.

2. The herein-described metalloceramic resistance consisting of a metallic powder, crushed quartz, kaolin and a flux, substantially as described.

3. The herein-described metalloceramic resistance consisting of powdered nickel, crushed quartz, kaolin combined with a flux consisting of silica, carbonate of lead and calcined borax all in substantially the proportions specified.

In witness whereof I have hereunto set my hand in presence of two witnesses.

LOUIS PARVILLÉE.

Witnesses:
EDWARD P. MACLEAN,
JULES FAYOLLET.